UNITED STATES PATENT OFFICE.

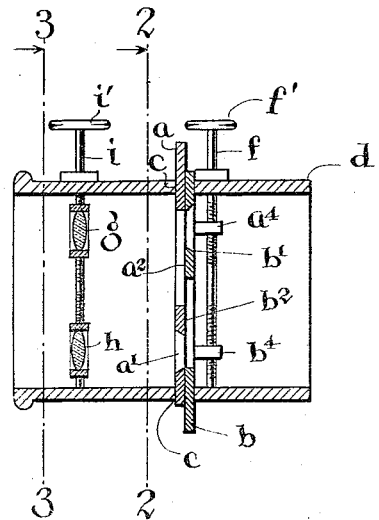
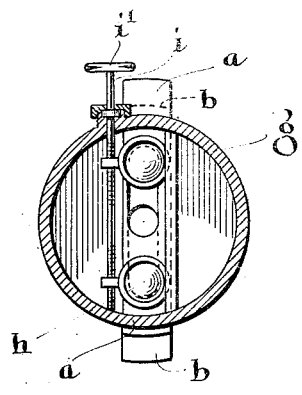
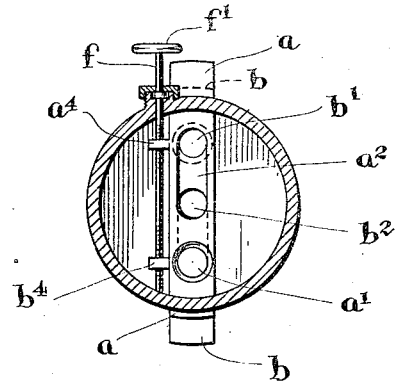

GEORGE WILLIAM COOPER, OF LONDON, ENGLAND.

DIAPHRAGM FOR PHOTOGRAPHIC LENSES.

1,372,645.  Specification of Letters Patent.  Patented Mar. 22, 1921.

Application filed March 25, 1914. Serial No. 827,102.

*To all whom it may concern:*

Be it known that I, GEORGE WILLIAM COOPER, a subject of the King of Great Britain and Ireland, and residing at Shaftesbury Hotel, Great St. Andrew's street, Shaftesbury avenue, London, W. C., England, have invented certain new and useful Improvements Relating to Diaphragms for Photographic Lenses, of which the following is a specification.

This invention relates to photographic cameras with particular reference to diaphragms that are employed therewith, of the kind provided with a plurality of apertures for the purpose of obtaining stereoscopic or relief effects by means of superposed images.

The invention also has reference to cameras used for producing superposed images of the kind in which a plurality of lenses is employed.

The object of the present invention is to combine the advantages of both the above arrangements and devise such improvements in the same as shall enable the artistic effects that are so much sought after to be readily obtained which effects have hitherto been produced only imperfectly either by a combination of lenses or by means of a gauze cap placed over the lens.

The invention consists in the combination with a stop of the above kind of a separate lens for each aperture.

The invention further consists in the provision of means for moving the lenses laterally relatively to one another.

The invention further comprises the particular form of apparatus hereinafter more particularly referred to.

The accompanying drawings illustrate one mode of carrying out the invention.

Figure 1 is a central vertical longitudinal section through the apparatus.

Fig. 2 is a transverse section on line 2—2 of Fig. 1, and Fig. 3 is a transverse section on line 3—3 of Fig. 1.

In carrying the invention into effect in one convenient manner, I provide a diaphragm comprising a plurality of parts, say, for example, two, each of which is provided with an aperture, the said parts being so arranged that they may be moved laterally relatively to one another so that the distance between the apertures may be adjusted according to the effect desired.

Referring to Figs. 1 and 2 of the drawing, $a$ and $b$ represent parts of the diaphragm mounted to slide in slots $c$ of the tube $d$. The parts $a$ and $b$ are provided with apertures $a'$ and $b'$ and with slots $a^2$ and $b^2$, the aperture of one part disposed opposite the slot of the other part. A right and left hand screw rod $f$ mounted in the tube $d$ and provided with a knob $f'$ engages the threaded lugs $a^4$ and $b^4$ of the parts of the diaphragm. By turning the screw rod in one direction or the other the parts are caused to slide in rectilinear paths either inward or outward so that the distance between the apertures $a'$, $b'$, may be correspondingly adjusted.

In connection with such adjustable diaphragm members, I use two lenses $g$ and $h$, which are adjustable toward or from each other. As shown in Fig. 3, two lenses $g$—$h$ are shown and a right and left hand screw rod $i$ provided with a knob $i'$ engages the frames of the lenses, so that by turning the screw rod, the lenses can be moved relatively one to the other.

By means of my invention I am enabled to produce very readily the artistic effects arrived at by what is known as "diffused focusing" which have hitherto been produced either by a combination of lenses or by means of a gauze cap placed over the lens.

Having now described my invention what I claim as new and desire to secure by Letters Patent is:—

1. For use in photographic cameras, a device comprising in combination, a supporting tube, a diaphragm comprising two members having overlapping portions and mounted in said tube, each member being provided with a pair of apertures, a lens for each of said members, and means for moving said diaphragm members in opposite directions.

2. For use in photographic cameras, a device comprising a supporting tube, a diaphragm comprising two overlapping parts each of which is provided with a pair of spaced apart apertures, a lens for each part of said diaphragm, means for moving said parts laterally relatively to each other, and means for moving said lenses laterally relatively to each other.

3. For use in photographic cameras, including a supporting tube, a diaphragm comprising two members having overlapping parts each member being provided with a pair of apertures, a right and left hand screw connected with said overlapping parts of the diaphragm for moving them in opposite directions, and a lens for each of said members of the diaphragm.

4. For use in photographic cameras, a device comprising a supporting tube, a diaphragm comprising a pair of overlapping members each member provided with spaced apart apertures of different areas, a right and left hand screw for moving said members laterally relatively to each other, a lens for each of said members, and a right and left hand screw for laterally moving said lenses relatively to each other.

In testimony whereof I have signed my name to this specification in the presence of two subscribing witnesses.

GEORGE WILLIAM COOPER.

Witnesses:
H. D. JAMISON,
O. J. WORTH.